July 19, 1938.  A. A. COOK ET AL  2,124,161
FOCUSING CAMERA
Filed Feb. 25, 1936  2 Sheets-Sheet 2

ALAN A. COOK
OTTO E. TRAUTMANN
INVENTOR

BY
ATTORNEY

Patented July 19, 1938

2,124,161

UNITED STATES PATENT OFFICE 2,124,161

FOCUSING CAMERA

Alan A. Cook, Rochester, and Otto E. Trautmann, Irondequoit, N. Y., assignors to Bausch & Lomb Optical Company, Rochester, N. Y., a corporation of New York Application February 25, 1936, Serial No. 65,652

7 Claims. (Cl. 95—44)

The present invention relates to cameras and focusing systems therefor and more particularly to focusing systems of the rangefinder type.

One of the objects of the present invention is to provide a camera focusing system which is compact and simple yet effective and accurate. Another object is to provide a combined range and view finder for cameras. A further object is to provide a camera range and view finder in which one lens of the view finder system is laterally slidable for rangefinding purposes. Another object is to provide a camera having a rangefinder with a slidable element and a focusing objective mount with a rangefinder actuating cam in which both the cam and the element move in planes parallel and adjacent to the front wall of the camera. A still further object is to provide a new and improved focusing objective mount having means to actuate a rangefinder system. These and other objects and advantages reside in certain novel features of construction, arrangement and combination of parts as will hereinafter be more fully set forth and pointed out in the appended claims.

Referring to the drawings:

Fig. 5 is a top plan view of the focusing objective mount partly in section.

Figure 1:
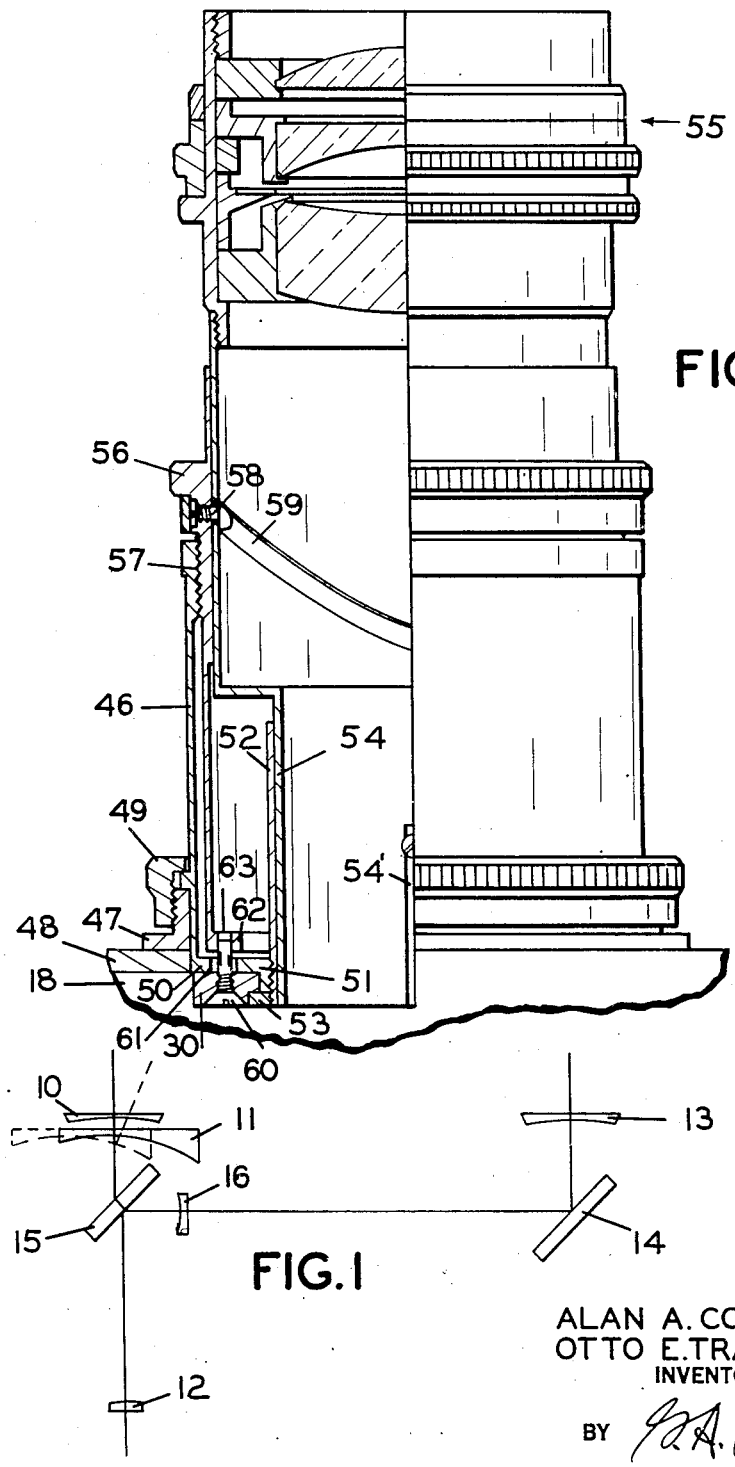
Fig. 1 is a diagrammatic view of the combined range and view finder.

In the preferred embodiment illustrated in the drawings, the view finder is of the reversed Galilean type having a negative front system composed of the negative lenses 10 and 11 and a positive eye lens 12. The negative lens 10 is fixed and another negative lens 13 is also fixed with its axis parallel to and spaced from the axis of the lens 10. A reflector 14 is fixed behind the lens 13 and directs the rays from the lens 13 toward the axis of the lens 10. A semi-reflecting element 15 is fixed in position so that it transmits the rays from the lens 10 and reflects the rays from the lens 13 and reflector 14 into the eye lens 12. It is essential that the power of both negative systems be made equal and so a compensating lens 16 is used between the lens 13 and the semi-reflecting element 15 so that the combined power of the lenses 10 and 11 is exactly the same as the combined power of the lenses 13 and 16.

Although any one of the lenses 10, 11, 13, or 16 could be moved for rangefinding purposes, we prefer to slide the lens 11 laterally in a plane perpendicular to its optical axis. When the lens 11 moves from the full line position in Fig. 1 to the dotted position, it is apparent that a prism component is introduced and the line of sight is along the dotted line rather than along the axis of the lens 10. Ordinarily, two images of an object are observable at the eye lens 12 and the lens 11 is moved until these two images coincide. The amount of lateral movement of the lens 11 necessary to cause coincidence of the images is a function of the distance or range of the object.

Another reason that we prefer to shift the lens 11 is that the lens 13 is located closely adjacent the objective and the parallax resulting from the spacing of the optical axis of the lens 13 and of the objective is practically negligible. By shifting the lens 11, which is located at the end of the rangefinder removed from the objective, the parallax resulting from the spacing of the optical axes of the lens 11 and of the objective is avoided. The parallax error of the viewfinder is therefore so small as to be unnoticeable.

Figure 2:
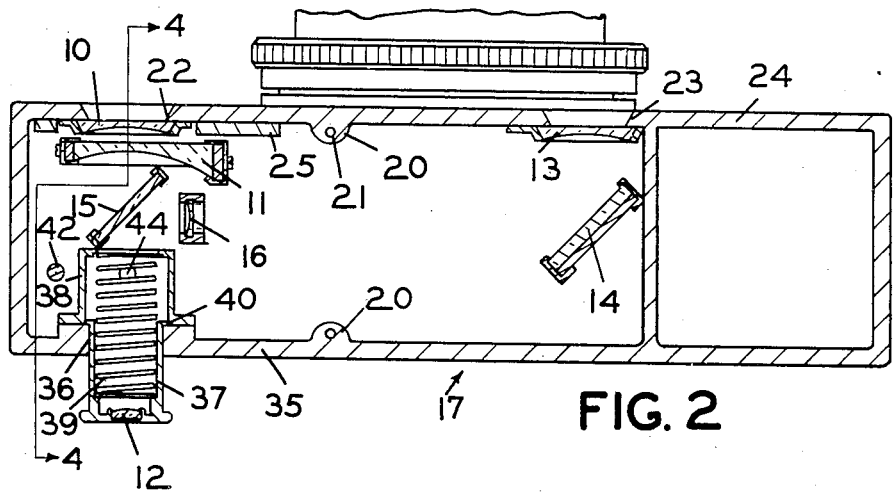
Fig. 2 is a horizontal section through the camera showing the range and view finder elements.
Figure 3:
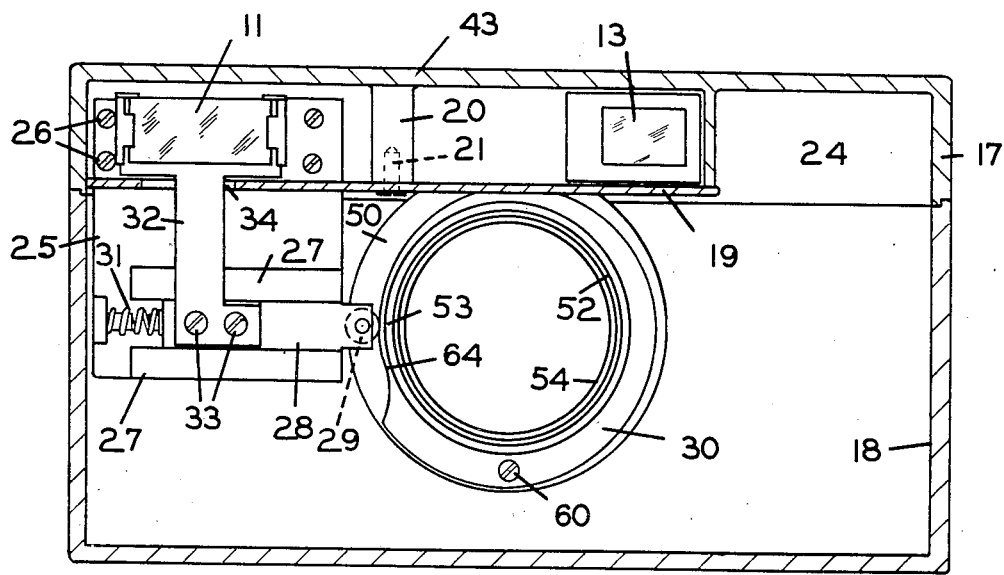
Fig. 3 is a vertical section through the camera.
Figure 4:
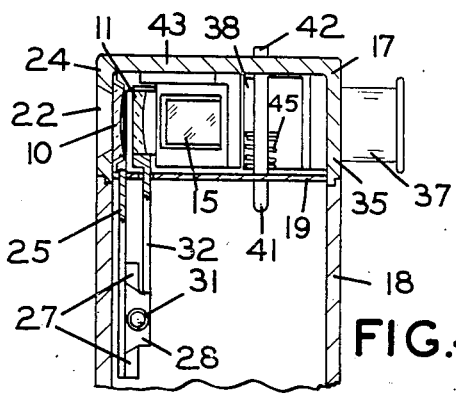
Fig. 4 is a fragmentary vertical section taken on line 4—4 of Fig. 2.

Referring now to Figs. 2, 3, and 4, the camera is made in two parts, an upper compartment 17 and a lower compartment 18. The film handling and exposure mechanisms, not shown, which form no part of the present invention, may be located in the lower compartment 18. The upper compartment 17 is closed at the bottom by a partition 19, secured to projections 20 in the compartment 17, by screws 21.

The lenses 10 and 13 are fixed in windows 22 and 23 in the front wall 24 of the upper compartment 17 and the reflector 14 and semi-reflector 15 are fixedly mounted within the compartment 17 parallel to each other and directly behind the lenses 13 and 10, respectively. A bracket 25, secured to the front wall 24 adjacent the window 22 by screws 26, extends downwardly through the partition 19 and carries at its lower end two parallel, horizontal members 27 forming a dove-tail guide. A slide 28 is mounted in this guide and carries a cam follower roller 29 at one end for cooperation with the cam 30, in a manner to be hereinafter described. The slide 28 is urged toward the cam 30 by a spring 31.

A support 32, fixed on the slide 28 by screws 33, extends upwardly through a slot 34 in the partition 19 into the compartment 17. The lens 11 is fixed on the upper end of the support 32 between the lens 10 and the semi-reflector 15. The compensating lens 16 is fixed in the compartment 17 between the reflector 14 and the semi-reflector 15.

Directly opposite the window 22, the rear wall 35 of the compartment 17 has an opening 36 within which a sleeve 37, carrying the eye lens 12, is slidably mounted. A sleeve 38 is mounted on the inner face of the wall 35 surrounding the aperture 36 and a spring 39, acting between the sleeves 37 and 38, serves to urge the sleeve 37 and eye lens 12 outwardly into the extended position shown in Figs. 2 and 4. The sleeve 37 has at its inner end a flange 40 which engages the sides of the aperture 36 to limit the outward movement of the sleeve 37. The sleeve 37 may be latched in retracted position within the compartment 17 by means of a rod 41. This rod 41 is J-shaped, the longer arm 42 extending upward through the top wall 43 of the compartment 17, and the shorter arm 44 extending upward into the sleeve 38. A spring 45 urges the rod 41 upward. When the sleeve 37 is in retracted position, the short arm 44 engages the flange 40 and holds the sleeve 37 in position while pressure on the arm 42 will move the arm 44 out of engagement with the flange 40 and permit the sleeve 38 to move outward under the action of the spring 39.

Referring now to Fig. 5, the objective mount comprises an outer sleeve 46 which is secured to an attaching ring 47 on the front wall 48 of the compartment 18 by means of a locking ring 49. Any desired form of attaching means could be used but the preferred form is that shown in Patent 1,971,434 issued August 28, 1934 to O. E. Trautmann.

The sleeve 46 has an inwardly extending flange 50 at its rear end and this flange carries a concentric, rearwardly extending ring 51. The cam 30 is rotatably journalled on the outside of the ring 51 and a guide sleeve 52 is threaded inside the ring 51. A ring 53, threaded on the end of the guide sleeve 52, serves to lock the sleeve 52 and constrain the cam 30 against axial movement on the ring 51. An inner sleeve 54 is slidably mounted in the guide sleeve 52 and is held against rotation therein by a key 54'. This inner sleeve 54 carries the objective indicated generally at 55.

Focusing is accomplished by means of an intermediate sleeve 56 which is threaded in the outer sleeve at 57 and carries a pin 58 for cooperation with a cam slot 59 in the objective-carrying inner sleeve 54. It can thus be seen that rotation of the intermediate sleeve 56 will cause forward or backward movement of the sleeve 54 and objective 55.

A pin or screw 60 is secured to the cam 30 and extends through a concentric slot 61 extending part way around the flange 50. The intermediate sleeve 56 has an inwardly extending flange 62 at its rear end and an opening 63 therein slidably receives the pin or screw 60 so that rotation of the focusing sleeve 56 necessarily rotates the cam 30.

As the slot 61 can extend only part way around the flange 50, the entire focusing movement of the objective must be obtained by a rotation of the sleeve 56 through an arc no greater than the arc of the slot 61. It has been found desirable to fix this arc at approximately 180 degrees. The extent of the focusing movement of the objective can be readily determined when the focal length of the objective and the near point of focus are known, and, as the amount of rotation of the sleeve 56 is fixed at approximately 180 degrees, the pitch of the cam slot 59 is readily determinable.

In determining the curve for the plate cam 30, the focal point of the lens 55 for each angular position of the sleeve 56 is first determined from the pitch of the cam slot 59. The amount of lateral movement of the lens 11 necessary to cause coincidence of the images at any distance can be readily calculated when the spacing of the lenses 10 and 13 and the power of the lens 11 are known. This movement for different distances can also be determined by actual experiment. With both the angular movement of the sleeve 56 and the lateral movement of the lens 11 known, the cam 30 can be readily plotted.

Different objectives can be used interchangeably according to this invention. To change objectives, the locking ring 49 is released and the outer sleeve 46 carrying the cam 30 and the focusing mechanism is removed as a unit. Each objective mount will thus carry its own cam 30 for actuating the rangefinder. In order to prevent bending of the slide 28 or roller 29 when an objective is attached, the cam 30 has a low point 64 with which the roller 29 or slide 28 cannot contact. The objective mount is always attached to the camera in such position that this low point 64 is opposite the roller 29.

From the foregoing, it will be apparent that we are able to attain the objects of our invention and provide a camera having a combined view finder and focusing mechanism which is simple and rugged yet compact and accurate. Various modifications can, of course, be made without departing from the spirit of our invention or the scope of the appended claims.

We claim:

1. In a combined range and view finder, a pair of negative lenses in fixed, spaced parallel relation, means for directing the rays from one lens toward the axis of the other lens, an eye lens spaced rearwardly of said other lens, means for combining the rays from both negative lenses and directing the combined rays toward the eye lens, a second pair of negative lenses, one between each of said first pair of negative lenses and said ray combining means and means for shifting one of said second pair of negative lenses laterally.

2. In a combined range and view finder, two fixed, spaced, parallel negative lenses, a reflector behind one lens directing the rays entering said lens toward the axis of the other lens, an eye lens coaxial with said other lens and spaced rearwardly thereof, a semi-reflecting member between said other lens and said eye lens to combine the rays from both negative lenses and direct them toward said eye lens, a third negative lens between one of said first two negative lenses and said eye lens, and means for shifting said third negative lens laterally.

3. In a combined range and view finder, two fixed, spaced, parallel negative lenses, a reflector behind one lens directing the rays entering said lens toward the axis of the other lens, an eye lens coaxial with said other lens and spaced rearwardly thereof, a semi-reflecting member between said other lens and said eye lens to combine the rays from both negative lenses and direct them toward said eye lens, a third negative lens between said other negative lens and said semi-reflecting member, and means for shifting said third negative lens laterally.

4. An objective mount for a camera having a rangefinder and a rangefinder operating mechanism comprising an outer sleeve adapted to be secured at its inner end to said camera, an inwardly extending flange on the inner end of said sleeve, a guide sleeve fixed within said flange concentrically of said outer sleeve, an inner sleeve, slidably but non-rotatably mounted in said guide sleeve, an objective carried by said inner sleeve, an intermediate sleeve rotatably carried by said outer sleeve and having a cam connection with said inner sleeve, a plate cam rotatably carried by said flange for actuating said rangefinder operating mechanism and means operatively interconnecting said cam and said intermediate sleeve.

5. A lens mount for a camera having a rangefinder and rangefinder operating mechanism comprising an outer sleeve adapted to be secured to the camera, an inwardly extending flange on the inner end of said sleeve, an intermediate sleeve rotatably carried within said outer sleeve, an inner sleeve, a lens carried by said inner sleeve, a pin and slot connection between said inner sleeve and said flange, a cam connection between said inner sleeve and said intermediate sleeve, a cam rotatably mounted on said flange for actuating the rangefinder operating mechanism, and means for interconnecting said cam and said intermediate sleeve.

6. In a camera having a rangefinder and mechanism for operating said rangefinder, an objective mount comprising an outer sleeve adapted to be secured at its rear end to said camera, an inwardly extending concentric flange on the rear end of said sleeve, a rearwardly extending concentric ring on said flange, a cam rotatably mounted on said ring for actuating said rangefinder mechanism, a concentric slot in said flange, a pin fixed in said cam and extending through said slot, a guide sleeve fixed within the said ring, an inner sleeve slidably but non-rotatably mounted within said guide sleeve, an objective within said inner sleeve, an intermediate sleeve rotatably mounted within said outer sleeve, a cam connection between said intermediate sleeve and said inner sleeve and means for connecting said intermediate sleeve and said pin.

7. In a camera having a rangefinder and mechanism for operating said rangefinder, an objective mount comprising an outer sleeve adapted to be secured at its rear end to said camera, an inwardly extending concentric flange on the rear end of said sleeve, a rearwardly extending concentric ring on said flange, a cam rotatably mounted on said ring for actuating said rangefinder mechanism, a concentric slot in said flange, a pin fixed in said cam and extending through said slot, a guide sleeve fixed within the said ring, an inner sleeve slidably but non-rotatably mounted within said guide sleeve, an intermediate sleeve threaded within said outer sleeve, a cam connection between said intermediate sleeve and said inner sleeve and means for slidably connecting said intermediate sleeve and said pin.

ALAN A. COOK.
OTTO E. TRAUTMANN.